(12) United States Patent
Maertens

(10) Patent No.: US 6,945,556 B2
(45) Date of Patent: Sep. 20, 2005

(54) AIRBAG FABRIC DIFFUSER

(75) Inventor: Paul G. Maertens, Highland, MI (US)

(73) Assignee: Takata Restraint Systems, Inc., Auburn Hills, MI (US)

(*) Notice: Subject to any disclaimer, the term of this patent is extended or adjusted under 35 U.S.C. 154(b) by 0 days.

(21) Appl. No.: 10/306,122

(22) Filed: Nov. 29, 2002

(65) Prior Publication Data

US 2004/0104561 A1 Jun. 3, 2004

(51) Int. Cl.[7] .................. B60R 21/22; B60R 21/24; B60R 21/26
(52) U.S. Cl. .................. 280/729; 280/730.2; 280/740; 280/742
(58) Field of Search ................ 280/740, 730.2, 280/730.1, 729, 743.1, 743.2, 749, 742

(56) References Cited

U.S. PATENT DOCUMENTS

| | | | |
|---|---|---|---|
| 3,853,334 A | 12/1974 | Auman et al. .............. | 280/150 |
| 4,097,064 A | 6/1978 | Ikawa et al. ............... | 280/732 |
| 4,188,004 A | 2/1980 | Fulton et al. ............... | 248/74 |
| 4,248,459 A | 2/1981 | Pate et al. .................. | 285/319 |
| 4,265,468 A * | 5/1981 | Suszko et al. .............. | 280/740 |
| 4,379,537 A | 4/1983 | Perrault et al. ............. | 248/74 |
| 4,536,008 A | 8/1985 | Brown, Jr. ................. | 280/730 |
| 4,601,367 A | 7/1986 | Bongers .................... | 188/376 |
| 4,702,515 A | 10/1987 | Kato et al. ................. | 296/189 |
| 4,752,054 A | 6/1988 | Jonsson ..................... | 248/51 |
| 4,863,129 A | 9/1989 | Adams ..................... | 248/206.2 |
| 5,074,583 A | 12/1991 | Fujita et al. ............... | 280/735 |
| 5,172,932 A | 12/1992 | Watanabe et al. ........... | 280/728 |
| 5,172,933 A | 12/1992 | Strasser .................... | 280/740 |
| 5,292,151 A | 3/1994 | Parker ...................... | 280/728 |
| 5,573,270 A | 11/1996 | Sogi et al. .................. | 280/740 |
| 5,593,179 A | 1/1997 | Maruyama ................. | 280/740 |
| 5,848,805 A | 12/1998 | Sogi et al. ................. | 280/743.2 |
| 5,957,487 A | 9/1999 | Stutz ........................ | 280/730.2 |
| 6,279,944 B1 * | 8/2001 | Wipasuramonton et al. ..... | 280/740 |
| 6,334,625 B1 | 1/2002 | Pausch et al. .............. | 280/729 |
| 2002/0101066 A1 * | 8/2002 | Tanase et al. .............. | 280/730.2 |
| 2003/0090093 A1 * | 5/2003 | Ikeda et al. ............... | 280/730.2 |

FOREIGN PATENT DOCUMENTS

| | | | | |
|---|---|---|---|---|
| GB | 2 324 068 A | | 10/1998 | .............. 21/22 |
| JP | 2002029359 A | * | 1/2002 | ......... B60R/21/22 |
| WO | WO 98/22313 | | 5/1998 | .............. 21/22 |

* cited by examiner

*Primary Examiner*—Peter C. English
(74) *Attorney, Agent, or Firm*—Ragglo & Dinnin, P.C.

(57) ABSTRACT

A perforated fabric diffuser and perforated cushion deflector are sewn inside an outer shell, thus forming a diffuser system within an airbag. The diffuser contains a plurality of openings along a folded edge. The deflector contains a wall defining at least one orifice for attenuating gas flow upon airbag activation. The airbag contains an inlet that fluidly communicates with the deflector and diffuser upon airbag activation. The outer shell is preferably sewn in such a manner as to maintain a plurality of individual cell areas. The fabric diffuser system is disposed within the outer shell such that the diffuser openings are positioned generally over the individual cells. During deployment, the diffuser system thereby functions to facilitate substantially even inflation throughout the airbag.

26 Claims, 2 Drawing Sheets

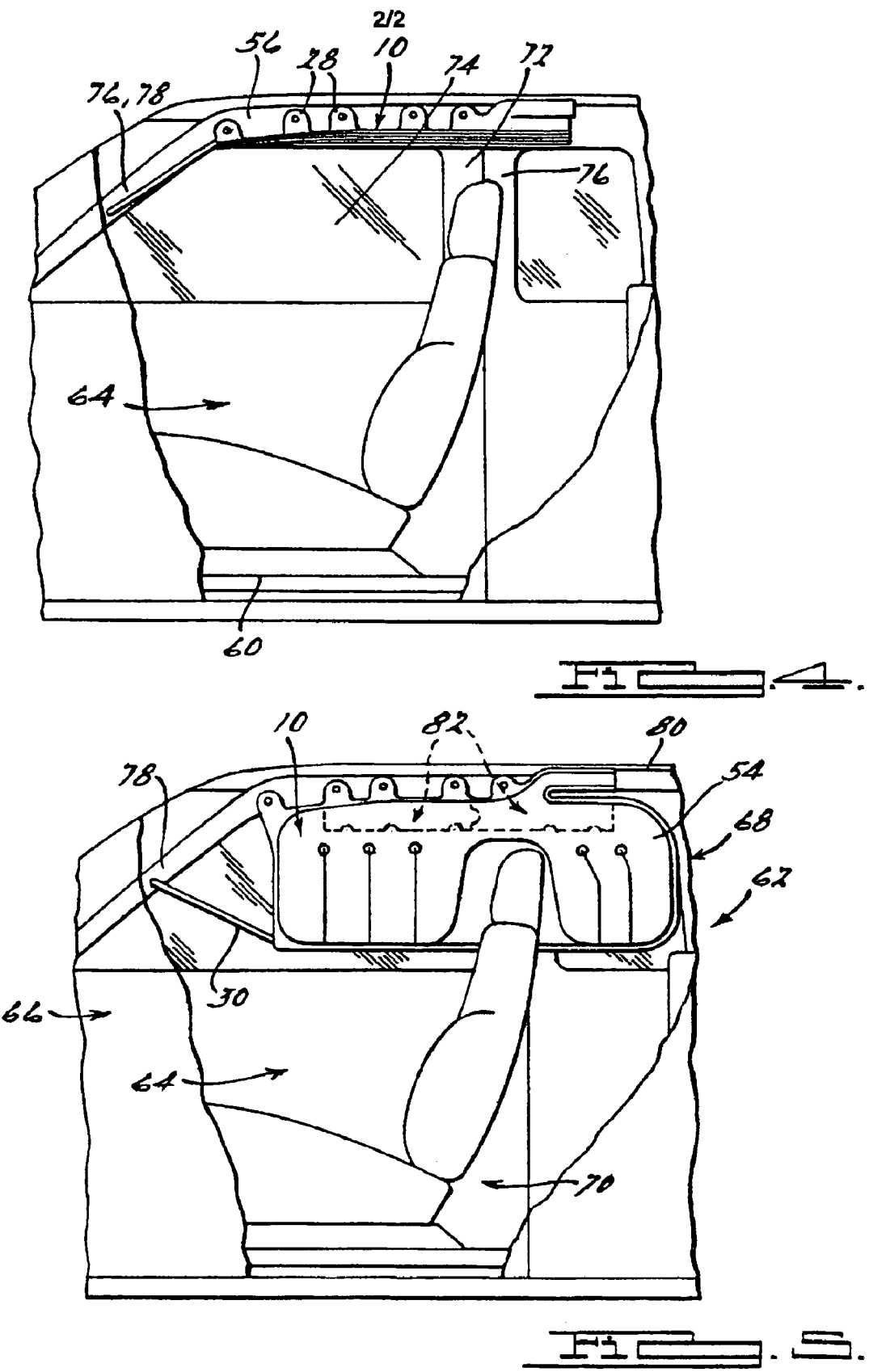

AIRBAG FABRIC DIFFUSER

FIELD OF THE INVENTION

The present invention relates generally to safety restraint systems using airbags and particularly to an airbag containing a perforated cloth diffuser and a perforated cushion deflector. A preferred configuration facilitates even deployment of a head side airbag for protection of vehicle occupants from side impact.

BACKGROUND AND SUMMARY OF THE INVENTION

As the automobile has developed, so have methods of ensuring passenger safety. Several methods of safety restraint systems have emerged during this development, including the airbag. Since the introduction of the airbag various degrees of implementing it have emerged including use in protecting passengers from side impact scenarios. To achieve this, vehicle designers have placed airbag systems in a number of locations including passenger seats, vehicle doors and vehicle roof frames. Various methods of improving airbag performance have also been developed. One example, pertinent to the present invention, is the use of a cylindrical metal diffuser that facilitates even deployment or inflation of the airbag.

It is an object of the present invention to make a significant improvement over side impact airbag systems through implementation of an improved diffuser system. Although effective, traditional metal diffusing systems often tend to be relatively expensive and may require an increased amount of packaging space. This has an overall effect of limiting the areas wherein diffused airbag systems can be implemented. The present invention replaces the traditional metal diffuser systems with a fabric diffuser. The fabric diffuser offers the same performance as the traditional diffusers, however, it boasts distinct advantages. Initially, a fabric diffuser is both lightweight and cost effective. Manufacture of a fabric diffuser is also less complicated than that of a metal diffuser. A more significant advantage is that fabric diffuser systems in accordance with the present invention have improved packaging characteristics over traditional metal diffusers and can disperse gas rearwardly into the cushion. A fabric diffuser, in contrast to a metal diffuser, can be tightly folded with the overall airbag in its initial packaging. As a result, more options are open to designers in locating airbag systems.

An airbag of the present invention comprises a sewn outer shell, and a diffuser system, to include a perforated fabric diffuser and a perforated cushion deflector, disposed within the sewn outer shell. As a result of the advantages described above, the airbag can be inconspicuously packaged in the upper trim running a distance along the front and rear passenger windows. The sewn outer shell is preferably sewn in such a way as to form individual cell areas. In a preferred embodiment, the diffuser incorporates a series of openings along its edge that are located at an area generally above each of the individual cells. Upon deployment of the airbag, the inflation gas initially inflates the diffuser system. The diffuser system then channels the gas to the individual cells, causing the airbag to be evenly inflated. Such a system offers a significant degree of protection for both front and rear passengers. The present airbag is particularly useful as a head side airbag, but not however thereby limited.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the scope of the invention will become apparent to those skilled in the art from the following detailed description.

BRIEF DESCRIPTION OF THE DRAWINGS

FIG. 4 is a schematic view of a vehicle passenger compartment with an undeployed head side airbag in accordance with the present invention; and FIG. 5 is a schematic view of a vehicle passenger compartment with the head side airbag deployed in accordance with the present invention.

DETAILED DESCRIPTION OF THE PREFERRED EMBODIMENTS

The present invention is primarily directed at airbag or vehicle occupant protection systems and more specifically to improving the adaptability and performance of such systems through the use of a diffuser system.

Figure 1:
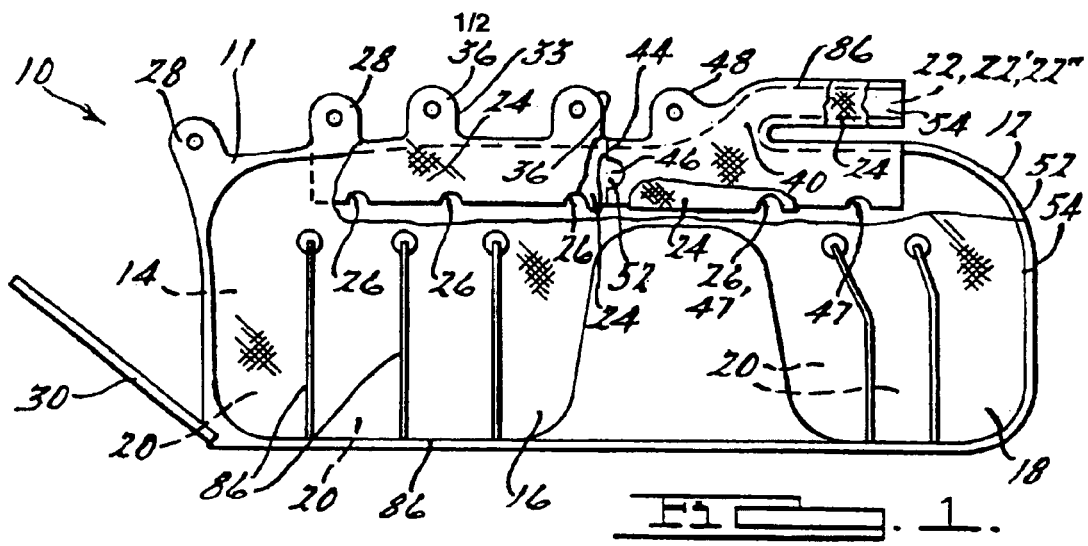
FIG. 1 is a partial cut-away side view of a head side airbag in accordance with the present invention.

With reference to FIG. 1, the side view of a head side airbag 10 (also referred to as a cushion) is displayed. An outer shell 12 is sewn in such a manner as to form an interior 14 and two portions, 16 and 18, each having a plurality of individual cells 20, and an inlet 22. Internal to the sewn outer shell is a fabric or cloth diffuser 24. The fabric or cloth diffuser 24 has a series of openings 26 along its edges and in a preferred embodiment, may also include an inlet or gas entry orifice 22' in lieu of an inlet on the airbag. The outer shell 12 is constructed in such a manner as to form a first plurality of tab portions 28 which are used to attach the airbag 10 to a vehicle (best shown in FIGS. 4 and 5). Additionally, a strap 30 is sewn to a corner of the airbag 10 and attached to the vehicle structure thereby stabilizing the forward portion of the airbag 10 during operation.

Figure 2:
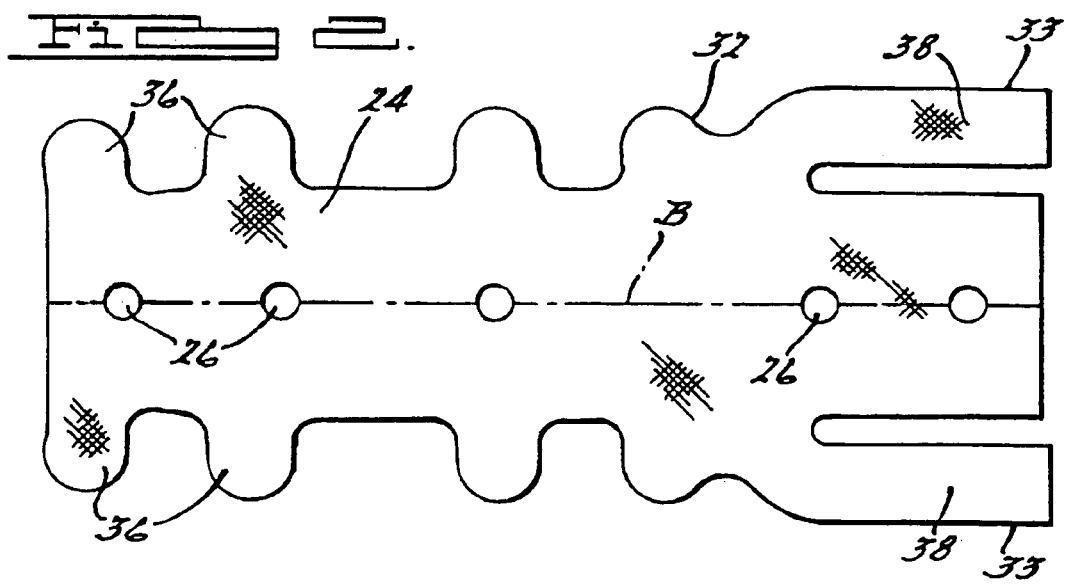
FIG. 2 is a top view of an unsewn perforated fabric diffuser pattern in accordance with the present invention.

The fabric or cloth diffuser 24 is formed from first unsewn pattern 32, shown in FIG. 2. The first unsewn pattern 32 includes a plurality of round holes or perforations that upon the folding of the first unsewn pattern 32 form the openings 26 extending across a portion of the length of the airbag 10, a second plurality of tab portions 36, and a first set of inlet halves 38. The cushion deflector 40 is formed from a second unsewn pattern 42. The second unsewn pattern 42 preferably includes a cloth wall 44 defining at least one gas flow attenuating orifice 46 used to balance the amount of gas dispersed between the forward and rearward portions of the airbag 10. Additionally, upon airbag assembly, orifices 47 of the cushion deflector 40 are aligned with openings 26 and thereby provide fluid communication between the fabric or cloth diffuser 24 and the cushion deflector 40. A third plurality of tab portions 48 extend from opposing sides of the second unsewn pattern 42 for reinforcement of the first plurality of tab portions 28. If desired, a second set of inlet halves 50 are provided at opposite ends of the cushion deflector 40 and upon airbag assembly also preferably define a gas entry orifice 22".

When assembling the airbag 10, the perforated cushion deflector 40 or the second unsewn pattern 42 is folded in half along a lateral axis "A" such that the third plurality of tab portions 48 on opposing sides of the second unsewn pattern 42 align with one another and the second set of inlet halves 50 align with one another. The folded second unsewn pattern 42 is sewn in between the folded fabric or cloth diffuser 24 thereby orienting the wall 44 generally transverse to the length of the airbag 10 or diffuser 24 (or to the gas flow), as shown in FIG 1. The first unsewn pattern 32 is folded in half along a longitudinal axis "B" such that the second plurality of tab portions 36 on opposing sides of the first unsewn pattern 32 align with one another and the first set of inlet halves 38 align with one another. As shown in FIG. 1, the folded first unsewn pattern 32, with the folded second unsewn pattern 42 positioned within first unsewn pattern 32, is sewn in between first and second panels 52 and 54 of the outer shell 12 so that the upper edge 33 of the folded first unsewn pattern 32 is sewn coincident with the upper edge 11 of the outer shell 12. The airbag 10 is preferably supported by a plastic cartridge or plastic interior molding (not shown), that is in turn supported by the roof frame 56. A protective cover (not shown) preferably envelopes the airbag 10. The first and second panels 52 and 54, respectively, of the outer shell 12 actually include the first plurality of tab portions 28 which overlap the second plurality of tab portions 36 of the fabric or cloth diffuser 24 and the third plurality of tab portions 48 of the cushion deflector 40 thereby reinforcing the mounting tabs 28 for attachment to the vehicle.

Figure 3:
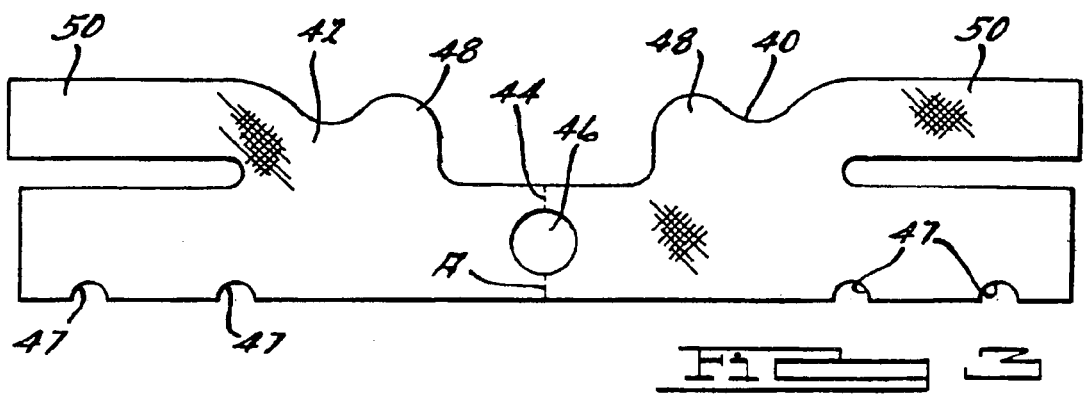
FIG. 3 is a top view of an unsewn perforated fabric cushion deflector in accordance with the present invention.

FIG. 4 depicts the head side airbag 10 mounted in a vehicle passenger compartment 64 with the airbag 10 in its uninflated state. The airbag 10 is mounted to a roof frame 56 opposite a vehicle floor 60. As shown in FIG. 5, a vehicle 62 has a passenger compartment 64 including a forward boundary 66, a rearward boundary 68, sides 70, wherein each respective side 70 contains a door 72, a side window 74, a plurality of pillars 76, and a roof frame 56. Additionally, the strap 30 is attached to both the airbag 10 and a first pillar 78. An inflating mechanism or airbag inflator 80, manufactured as known in the art, is also attached to the airbag 10 in fluid communication with inlet 22, and mounted to the roof frame 56. Upon a crash event, the inflating mechanism or airbag inflator 80 activates and the airbag 10 is thus deployed, as shown in FIG. 5. Stated another way, when triggered, the inflating mechanism or airbag inflator 80 releases gas into inlet 22 thereby inflating the airbag 10. The fabric or cloth diffuser 24 and the cushion deflector 40 taken together form a diffuser system 82. The diffuser system 82 is initially inflated and directs the gas flow via the openings 26 into the individual cells 20 of the airbag 10. Importantly, gas flow entering inlet 22 and traversing through the fabric or cloth diffuser 24 is attenuated as it encounters the wall 44 and the attenuating orifice 46, thereby dispersing the gas flow across the airbag 10 in a substantially uniform fashion. As shown FIGS. 1, 3 and 5, the wall 44 is at least partially laterally transverse to the gas flow entering inlet 22, or transverse to the lengths of the fabric or cloth diffuser 24 and the airbag 10. The strap 30 functions to limit forward inward movement of the airbag 10 during the deployment process. Upon deployment, the airbag 10 aids in protecting the occupants by substantially covering the side windows 74 of the passenger compartment 64.

A stitch 86 is best shown in FIG. 1 and runs along the periphery of the airbag 10 to integrate the airbag components and to also define the sides of the cells 20. As shown in FIG. 1, the fabric or cloth diffuser 24 and the cushion deflector 40 are sewn in between the first and second panels 52 and 54 of the outer shell 12 such that stitch 86 integrates the fabric or cloth diffuser 24 and the cushion deflector 40 within the sewn outer shell 12. As described above, inlet or gas entry orifice 22', 22" is formed by sewing the first set of inlet halves 38 of the fabric or cloth diffuser 24 together, and/or, by sewing the second set of inlet halves 50 of cushion deflector 40 together. When both the first set of inlet halves 38 and the second set of inlet halves 50 are employed, for improved strength for example, the second set of inlet halves 50 are placed in an aligned and overlying relationship to the first set of inlet halves 38 prior to sewing within the first and second panels 52 and 54 of the outer shell 12. The airbag 10, and therefore the outer shell 12, the fabric or cloth diffuser 24, and, for example, the cushion deflector 40 are formed from nylon or other materials known for their use in airbags.

The invention being thus described, it will be obvious that the same may be varied in many ways. Such variations are not regarded as a departure from the scope of the invention, and all such modifications as would be obvious to one skilled in the art are intended to be included within the scope of the following claims.

What is claimed is:

1. An airbag system for use in an automobile passenger compartment comprising:
   an airbag having a given length comprising an inlet and a sewn outer shell, a perforated cloth diffuser and a perforated cushion deflector disposed internal to said outer shell, wherein said cushion deflector is disposed internal to said cloth diffuser, said cushion deflector comprises at least one gas flow attenuating orifice that provides for attenuating gas flow across said cloth diffuser, said cloth diffuser contains a plurality of gas distribution holes disposed across a portion of the length of said airbag, and said at least one gas flow attenuating orifice provides for attenuating gas flow from said inlet to a subset less than all of said gas distribution holes; and
   a gas inflation device attached to the inlet of said airbag, the inlet in fluid communication with said perforated cushion deflector and said perforated cloth diffuser.

2. The airbag system of claim 1, wherein said airbag is of sufficient size, in an inflated state, to substantially cover a side window portion of the automobile passenger compartment.

3. The airbag system of claim 1, wherein said cloth diffuser and cushion deflector facilitate substantially uniform inflation of said airbag.

4. The airbag system of claim 1, wherein said sewn outer shall is sewn in such a manner as to form individual cells in both a forward portion and rearward portion of said airbag.

5. The airbag system of claim 4, wherein said cloth diffuser runs along a length of a top portion of said sewn outer shell and at least one of said plurality of gas distribution holes is substantially aligned with a corresponding at least one of said individual cells.

6. The airbag system of claim 1, further comprising a strap to connect said airbag to a pillar.

7. An airbag for a vehicle occupant protection system, said airbag having an interior and a given length, the airbag further comprising:
   a shell forming the interior of said airbag;
   a perforated fabric diffuser contained within said shell, said diffuser formed to define a gas entry orifice and said diffuser further comprising a plurality of gas exit apertures in fluid communication with the interior and extending across a portion of the length of said airbag;
   a perforated fabric cushion deflector in fluid communication with and contained within said diffuser, said cushion deflector also formed to define said gas entry orifice, and said cushion deflector further comprising a fabric wall extending across an interior of said diffuser, said fabric wall comprising at least one gas flow attenuating orifice that upon airbag deployment is oriented at least partially laterally transverse to the length of the airbag, whereby upon airbag actuation gas flows through said gas entry orifice then through said cushion deflector and through said gas exit apertures then into the airbag interior and across the length of the airbag.

8. An airbag for a vehicle occupant protection system, said airbag defining a gas entry orifice, an interior, and a given length, the airbag further comprising:

a shell forming the interior of said airbag;

a perforated fabric diffuser fixed within said shell, said diffuser further comprising a plurality of gas exit apertures in fluid communication with said gas entry orifice and the interior of said airbag, and said plurality of gas exit apertures distributed across at least a portion of the length of said airbag;

a perforated fabric cushion deflector in fluid communication with and contained within said diffuser, said cushion deflector also in fluid communication with said gas entry orifice, said cushion deflector comprising a fabric wall extending across an interior of said diffuser, said fabric wall comprising at least one gas flow attenuating orifice wherein said wall upon airbag deployment is at least partially laterally transverse to the length of the airbag, whereby upon airbag actuation gas flowing through said gas entry orifice is attenuated at said gas flow attenuating orifice and forced through the gas exit apertures into the interior of the airbag.

9. A head side airbag system for use in an automobile passenger compartment, comprising:

an airbag adapted to be fixedly attached above a side window of the passenger compartment comprising a sewn outer shell, said sewn outer shell being sewn in such a manner as to form a plurality of individual cells in both a forward and rearward portion of said airbag, and a cloth diffuser and a cloth cushion deflector disposed internal to said sewn outer shell, said cloth diffuser comprising a plurality of holes disposed along an edge and said cloth cushion deflector comprising a perforated wall within said cloth diffuser, said wall defining at least one gas flow attenuating orifice and said wall extending across an interior of said diffuser at least partially laterally transverse to gas flow upon airbag actuation; and at least one gas inflation device, said inflation device fixed to an inlet of said airbag wherein said inlet fluidly communicates with said cloth diffuser, said cloth cushion deflector, and said plurality of holes upon airbag activation.

10. The head side airbag system of claim 9, wherein at least one of said plurality of holes of said cloth diffuser is substantially aligned with a corresponding at least one of said plurality of individual cells.

11. The head side airbag system of claim 9, wherein said airbag is of sufficient size, in an inflated state, to substantially cover a side window of the automobile passenger compartment.

12. The head side airbag system of claim 9, wherein said cloth diffuser facilitates substantially even inflation of said airbag.

13. The head side airbag system of claim 9, further comprising a strap to connect said airbag to a pillar.

14. A vehicle comprising:

a passenger compartment comprising a floor, a roof, a forward boundary, a rearward boundary and side, said sides being further comprised of at least one door, at least one window, a plurality of pillars and a roof frame;

at least one head side airbag system comprising an airbag fixedly attached to said roof frame, comprising a sewn outer shell, said sewn outer shell being sewn in such a manner as to perforated cloth diffuser and a perforated cushion deflector disposed internal to said sewn outer shell, said cloth diffuser comprising a plurality of holes disposed along an edge, said cushion deflector disposed internal to said cloth diffuser, and said cushion deflector is adapted to attenuate gas flow to a subset less than all of said plurality of holes disposed along said edge of said cloth diffuser; and at least one gas inflation device, said gas inflation device being fixed to an inlet of said airbag wherein said inlet fluidly communicates with said perforated cushion deflector, said perforated cloth diffuser, and said plurality of holes thereby facilitating inflation of said airbag upon actuation thereof.

15. The vehicle of claim 14, wherein at least one of said plurality of holes of said cloth diffuser is substantially aligned with a corresponding at least one of said plurality of individual cells.

16. The vehicle of claim 14, wherein said airbag is of sufficient size, in an inflated state, to substantially cover said at least one window of said passenger compartment.

17. The vehicle of claim 14, wherein said diffuser facilitates even inflation of said airbag.

18. The vehicle of claim 14, wherein a strap connects said airbag to at least one of said plurality of pillars.

19. An airbag, comprising:

an outer shell comprising first and second panels;

a cushion deflector comprising a first orifice along a first axis; and a diffuser comprising a plurality of second orifices along a second axis, wherein said outer shell, said diffuser and said cushion deflector are constructed of airbag cushion material, said cushion deflector is folded along said first axis, said diffuser is folded along said second axis substantially around said cushion deflector, said first and second axes are at least partially transverse with respect to one another, said diffuser is located substantially within said outer shell, said outer shell comprises an inlet adapted to receive an inflation fluid, said inlet is in direct fluid communication through said cushion deflector with said first orifice and with a first set of at least one of said plurality of second orifices, and said inlet is in fluid communication with a second set of at least one of said plurality of second orifices through said cushion deflector, through said first orifice, and through said diffuser, wherein said second set of at least one of said plurality of second orifices is different from said first set of at least one of said plurality of second orifices, whereby said first orifice is adapted to restrict a flow of inflation fluid therethrough.

20. An airbag as recited in claim 19, wherein said first and second panels are sewn to one another so as to form first and second interior portions, said first set of at least one of said plurality of second orifices are adapted to discharge said inflation fluid into said first interior portion, and said second set of at least one of said plurality of second orifices are adapted to discharge said inflation fluid into said second interior portion.

21. An airbag as recited in claim 20, wherein at least one of said first interior portion and said second interior portion comprise a plurality of individual cells, and at least one of said second orifices is aligned with a corresponding one of said plurality of individual cells so as to provide for discharging said inflation fluid from said at least one of said second orifices into said corresponding one of said plurality of individual cells.

22. An airbag as recited in claim 19, wherein said cushion deflector and diffuser are sewn between said first and second panels with at least one seam.

23. An airbag as recited in claim 19, wherein said cushion deflector comprises at least one first tab, said diffuser comprises at least one second tab, and at least one of said first panel and said second panel comprise at least one third tab, wherein at least one said first tab is aligned with at least one said second tab, and is aligned with at least one said third tab.

24. An airbag as recited in claim 23, wherein said at least one first tab, said at least one second tab, and said at least one third tab are adapted to attach the airbag to a vehicle.

25. An airbag as recited in claim 19, wherein said cushion deflector comprises a first inlet portion, said diffuser comprises a second inlet portion, and said first inlet portion and said second inlet portion are aligned with one another and with said inlet of said outer shell.

26. An airbag as recited in claim 25, wherein said first inlet portion, said second inlet portion and said inlet of said outer shell are sewn to one another with at least one seam.

* * * * *

UNITED STATES PATENT AND TRADEMARK OFFICE
CERTIFICATE OF CORRECTION

PATENT NO. : 6,945,556 B2  
DATED : September 20, 2005  
INVENTOR(S) : Paul G. Maertens It is certified that error appears in the above-identified patent and that said Letters Patent is hereby corrected as shown below:

Column 2,  
Line 45, please insert -- a -- after "from".

Column 3,  
Line 53, please insert -- in -- after "shown".  
Line 59, please delete "windows" and insert -- windows -- before "74".

Column 4,  
Line 48, please delete "shall" and insert -- shell -- before "is sewn in".

Column 6,  
Line 5, please delete "side" and insert -- sides -- after "rearward boundry and".  
Line 12, please insert -- form a plurality of individual cells in both a forward and rearward portion of said airbag, and a -- after "manner as to".

Signed and Sealed this

Twenty-ninth Day of November, 2005

JON W. DUDAS  
*Director of the United States Patent and Trademark Office*